United States Patent [19]
Plee et al.

[11] Patent Number: 5,928,623
[45] Date of Patent: Jul. 27, 1999

[54] USE OF A REACTOR STIRRED BY A SYSTEM OF THE ARCHIMEDEAN SCREW TYPE FOR THE SYNTHESIS OF LSX FAUJASITE

[75] Inventors: Dominique Plee, Lons; Jean-Jacques Masini, La Celle St Cloud, both of France

[73] Assignee: Ceca S. A., France

[21] Appl. No.: 08/893,567

[22] Filed: Jul. 11, 1997

[30]     Foreign Application Priority Data

Jul. 12, 1996 [FR] France .................................. 96.08781

[51] Int. Cl.$^6$ .................................................. C01B 39/22
[52] U.S. Cl. .................. 423/711; 423/700; 423/DIG. 21
[58] Field of Search ..................... 423/700, 710, 423/711, DIG. 21; 502/79

[56]             References Cited

U.S. PATENT DOCUMENTS

| | | | |
|---|---|---|---|
| 4,263,266 | 4/1981 | Michel et al. ........................... | 423/700 |
| 4,271,135 | 6/1981 | Wuest et al. ............................ | 423/710 |
| 4,368,174 | 1/1983 | Valyocsik et al. ...................... | 423/700 |
| 5,487,882 | 1/1996 | Hu et al. . | |
| 5,645,811 | 7/1997 | Kuhm et al. ..................... | 423/DIG. 21 |

FOREIGN PATENT DOCUMENTS

| | | | |
|---|---|---|---|
| 2357482 | 2/1978 | France . | |
| 7047713 | 3/1982 | Japan ............................. | 423/DIG. 21 |
| 1580928 | 12/1980 | United Kingdom . | |
| 1598042 | 9/1981 | United Kingdom .......... | 423/DIG. 21 |
| 96024662 | 1/1996 | WIPO . | |

OTHER PUBLICATIONS

European Search Report dated Nov. 10, 1997.
French Search Report dated Feb. 18, 1997.
Ulmann's Enclycopedia of Industrial Chemistry, vol. B2, pp. 25–4 to 24–5, (no date).
"An Introduction to Zeolite Molecular Sieves", A. Dwyer, John Wiley & Sons, 1988, p. 57. (no month).
"Hydrothermal Chemisry of Zeolites", R.M. Barrer, Academic Press, 1982, p. 171, (no month).
"Some Problems of Zeolite Crystallization", S.P. Zdhanov, Molecular Sieves Zeolites I., Adv.Chem.Ser. 101 (1971) (no month), p. 20.
Zeolites Molecular Sieves, D. W. Breck, John Wiley and Sons, 1974, (no month) pp. 725–731.
"Investigations on the Growth of the Zeolite Type Nay", H, Kacirek, et al, Journal of Physical Chemistry, vol. 79, No. 15, 1975 (no month) p. 1589.
"Zeolites and Their Synthesis", R.M. Barrer, Zeolites, (no month) 1981, vol. 1, pp. 130–140 (p. 132 ATTACHED).

Primary Examiner—Mark L. Bell
Assistant Examiner—David Sample
Attorney, Agent, or Firm—Bell, Boyd & Lloyd

[57]             ABSTRACT

The performances of the industrial manufacture of LSX faujasite are improved by proceeding to the aging and the crystallization of the gel by stirring with a Archimedean screw stirrer. In particular, the duration of the aging is shortened considerably without affecting the crystallinity of the final product.

3 Claims, 1 Drawing Sheet

USE OF A REACTOR STIRRED BY A SYSTEM OF THE ARCHIMEDEAN SCREW TYPE FOR THE SYNTHESIS OF LSX FAUJASITE

FIELD OF THE INVENTION

The present invention relates to the industrial manufacture of zeolites, more specifically faujasites with a low silica content.

BACKGROUND OF THE INVENTION

The term faujasites is used here to refer to a group of mineral species characterized by their crystallographic topographic structure, an excellent account of which can be found in the work by Donald W. Breck "Zeolite Molecular Sieves," published by John Wiley and Sons, 1974 pp. 92 ff. The so-called Lowenstein rules requires that they have an Si/Al ratio which is high, or at least equal to 1. Customarily the following distinctions are made:

X faujasites with Si/Al<1.5,

Y faujasites with Si/Al>1.5.

The classical X faujasites have an Si/Al ratio $R1x \geq .1.2$. The physical characteristics of the faujasites (exchange capacity, nitrogen adsorption, etc.) evolve as a function of the Si/Al ratio. The topic here relates to the faujasites with a Si/Al ratio equal to 1, which are called the LSX faujasites (in English Law Silica X faujasites), because of all the faujasites which can be considered, those are the ones which possess the maximum possible number of tetrahedral aluminum ions per crystalline unit, and because as a result they potentially have the highest number of adsorption sites for a very great variety of molecules such as $CO_2$, $N_2$, etc. It should be specified that in the sense of the present invention, LSX faujasite is understood to represent a zeolitic species whose Si/Al ratio is measured as $1\pm0.05$, where values below 1 reflect the analytical uncertainties in the measurement of this ratio, and higher values reflect either the same analytical uncertainty or a tolerable discrepancy in the purity of the product.

The process of synthesis of faujasites consists of two distinct steps, the first (aging) in which the precursor seed crystals appear, the second (crystallization) is a phase of growth of crystals from these seeds. The course of these steps depends on numerous physical and chemical factors which are not always well understood. In any case, the conditions of the medium determine the type of seeds formed and consequently the type of zeolite. What is known in any case is that the difficulties of the synthesis of faujasites increase when their Si/Al ratio decreases, and that the traditional methods fail for the preparation on a large scale of faujasites with an Si/Al ratio of 1, which are the object of the present invention. In particular, from a pure sodium medium the zeolite NaA is obtained, and it is necessary to introduce a certain quantity of potassium ions to synthesize the faujasite structure; it is recognized that the faujasite structure can be obtained for Na/Na+K ratios in the synthesis gel of 0.7–0.8. The synthesis of such zeolites with low Si/Al ratio has been described in the French Patent No. 2,357,482.

Very generally, the zeolites are prepared by crystallization of silicoaluminum aqueous compositions formed by a mixture of solutions of alkaline aluminates and sodium silicate at a temperature between room temperature and a temperature below their boiling point. With regard to the stirring conditions in these media, one is torn between two contradictory imperatives. Stirring means favoring the exchanges of matter and heat, and preventing the syneresis of the forming crystals. The other option is not to stir; in fact it has been observed in the synthesis of faujasites that stirring systematically led to certain disturbances, particularly a defect in the crystallinity of the zeolite, which was reported by R. M. Barrer (see Hydrothermal Chemistry of Zeolites, Academic Press, 1982, p. 171). It can also be observed, independently of an insufficiency of crystallinity, that parasitic phases appear; these phases form as a result of the destruction due to the stirring of certain unstable seeds. It is thought that in these cases, the local shearing can promote the appearance of certain seeds and the disappearance of certain others (see, for example, D. E. W. Vaughan, Chem. Eng. Prog., 48(2), 1988, pp. 25–31). In practice, for the industrial manufacture of LSX, inspiration is obtained from the teaching of G. H. Kühl (Zeolites, September, 1987, Vol. 7, pp. 451–457) and one omits the stirring, resigning oneself to longer aging and crystallization durations and thus to a very unsatisfactory industrial profitability.

Figure 1:
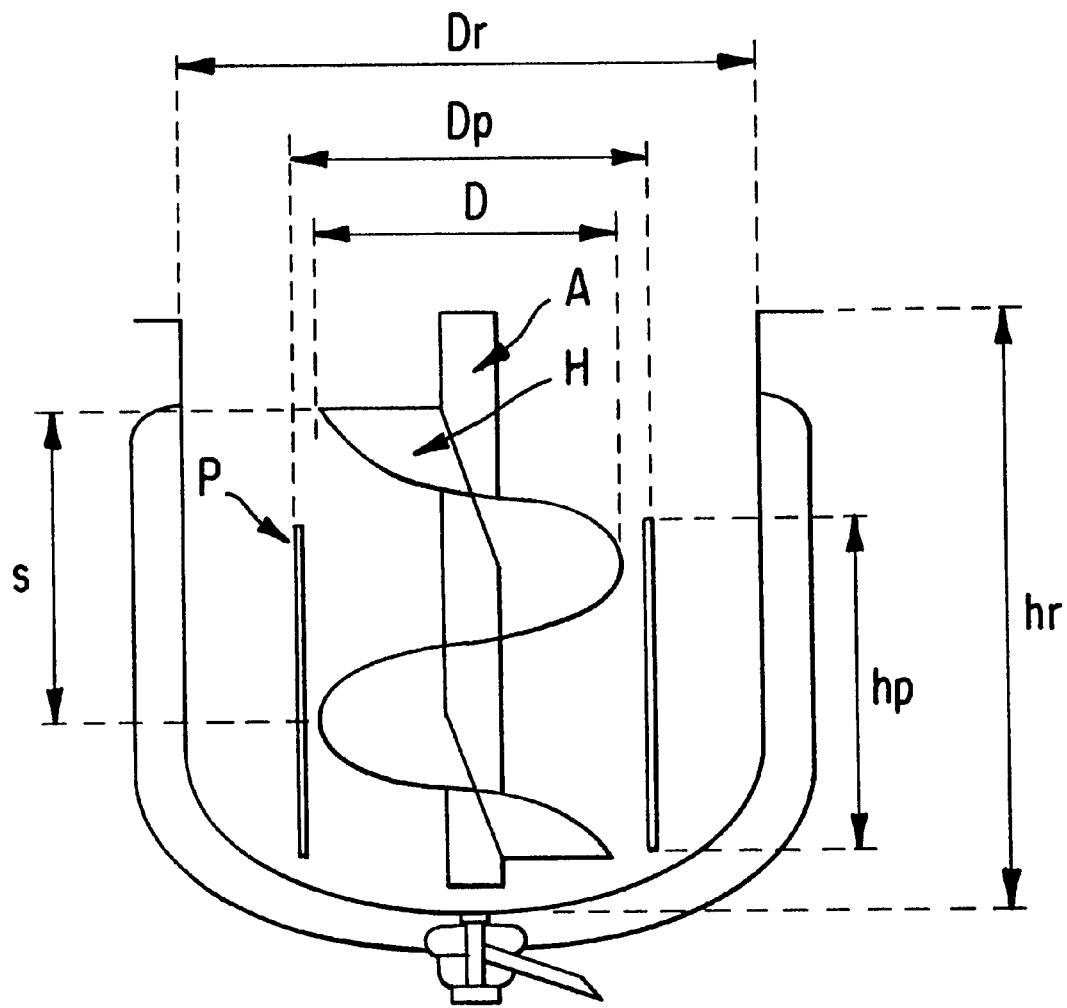
FIG. 1 depicts a stirring means but this embodiment is not considered to limit the invention.

It has just been observed that one could considerably improve the conditions of the manufacture of LSX by using an Archimedean screw as stirring means, a device which is well-known to persons skilled in the art, an example of which is given in the entry in Ullmann's Encyclopedia of Industrial Chemistry, VCH 1988, Vol. B2, pp. 25-5. It is a stirring device as shown in FIG. 1, whose moving part consists of a vertical axle (A) around which a helicoidal band (H) with pitch (s) is wound and, whose fixed part consists of a cylindrical wall (P) which is open at its two ends forming a guide tube circumscribing the envelope of the band and having a diameter (Dp). The helicoidal band is circumscribed by a cylinder generated by a revolution having a diameter (D). The Archimedean screw stirrer is housed in a reactor (R) with diameter (Dr) and height (hr). The guide tube is entirely immersed in the gel. To allow the circulation of the fluxes in the reactor, the height of the guide tube (hp) is less than the filling height of the reactor. It is preferred that these two heights are in a ratio of less than 0.95. The guide tube itself is shorter than the band so that the latter, in its rotation, is able to entrain the gel from the top to the bottom of the reactor. For its correct operation, an apparatus design is recommended in which the following relations are approximately observed:

0.3 $Dr \leq Dp \leq 0.9$ Dr, preferably 0.4 $Dr \leq Dp \leq 0.99$ Dr 0.3 $Dr \leq D \leq 0.9$, preferably D~0.55 Dr s~D The stirring speeds are slow; they vary from a few rpm to several tens of rpm. They are selected according to the usual criteria used by persons skilled in the art (rapidity of the exchanges of heat and matter, limitation of the decanting effect, rheology of the medium) so that the device does not impose on the gel an average shearing in the tank of more than 25 $sec^{-1}$.

With such a device, one advantageously proceeds to the synthesis of LSX faujasite by working with gels whose initial alumina, silica, NaOH and potash composition is such that one has, in mole ratios:

$Na_2O/(Na_2O+K_2O)$: 0.7–0.8

$H_2O/Al_2O_3$: 91–130

$SiO_2/Al_2O_3$: 1.8–2.2

$(Na_2O+K_2O)/Al_2O_3$: 5.5–8.

In this manner the overall duration of the industrial manufacturing process is considerably limited, with aging processes at approximately 30–60° C. occurring over durations of 10–40 h, and crystallizations at 50–100° C. taking 1–5 h. Various combinations of these steps of aging and crystallization are possible, and they are part of the present invention.

EXAMPLES

Example 1

Synthesis of the LSX zeolite on a laboratory scale
Preparation of the gel:
Solution of sodium and potassium aluminate:
demineralized water: 350 g
50% NaOH solution: 638 g
50% potash solution: 340 g
This solution is heated at 115° C., and the following is added:
hydrated alumina (gibbsite type) 146 g
After dissolution and cooling, the water lost to evaporation is added.
Solution of sodium silicate:
demineralized water: 880 g
sodium silicate: 440 g
In a 2.5-L reactor, the two solutions are mixed by means of a deflocculating turbine at 2000 rpm for 5 min to obtain a homogeneous gel. This composition corresponds to the following stoichiometry:

4.87 $Na_2O$: 1.63 $K_2O$: 2Si2$O_2$: 1 $Al_2O_3$: 130 $H_2O$

After mixing the reagents, NaOH silicate and sodiopotassic aluminate, the gel is allowed to mature for 20 h at 50° C., and then the crystallization is carried out for 4 h at 95° C., the aging and the crystallization being carried out under different stirring conditions as indicated in the table below.

The results obtained are expressed in crystallinity values measured by the toluene adsorption capacity at 25° C. at a partial pressure of 0.5, expressed with respect to a faujasite having a toluene adsorption capacity equal to 24%, used as reference for a 100% crystallinity.

| Stirring mode (aging, crystallization) | Temperature and duration of the aging | Temperature and duration of the crystallinization | Crystal-linity with respect to the reference |
|---|---|---|---|
| Static | 50° C./20 h | 95° C./4 h | 95% |
| Archimedean screw (50 rpm) | 50° C./20 h | 95° C./4 h | 97% |
| Magnetic Bar | 50° C./20 h | 95° C./4 h | 65% |
| MIXEL TT helix | 50° C./20 h | 95° C./4 h | 80% |

It is observed that:
the passage of the synthesis from the static medium to a dynamic medium causes a loss of crystallinity depending on the type of stirrer. The use of the Archimedean screw as a mixing tool allows the preservation of an optimal crystallinity, while at the same time ensuring an effective transfer of heat and matter;
the average anhydrous composition of the crystals is:
(0.75–0.77) $Na_2O$/(0.23–0.25) $K_2O$/(1.9–2.1) $SiO_2$/1 $Al_2O_3$ The composition does not differ appreciably depending on whether the LSX is synthesized in a dynamic reactor or in a static medium;
the average size of the crystals and the granulometric distribution determined by scanning electron microscopy (SEM) are not different (median diameter approximately 6 mm). Example 1 bis Alteration of the toluene index with increase in the stirring speed.

The conditions of the preceding example are reproduced, except that the gel is subjected to permanent stirring generated by an Archimedean screw stirrer for the aging period rotating at different speeds and generating the corresponding shearing rates reported in the table. The final product is tested for its toluene adsorption capacity at a partial pressure of 0.5 and at 25° C.

| Stirring speed (rpm) | Shearing rate ($sec^{-1}$) | Toluene index of LSX (%) |
|---|---|---|
| 50 | −25 | 22.3 |
| 100 | −50 | 22.1 |
| 200 | −100 | 21.4 |

These results indicate the regular degradation of the LSX with the increase in the stirring speed during the aging.

Example 2

Synthesis of the LSX zeolite on an industrial scale
Preparation of the reagents: the reagents are prepared as in Example 1, the numbers expressed above using grams as units are now expressed using kilograms.

The solution of aluminate is poured into a 3 $m^3$ reactor, and then, while mixing, the solution of silicate is added, during which operation the mixture first remains clear (for approximately 2 min) and then it starts to gel. The stirring is continued for an additional 5 min.

The conditions of aging and crystallization and the results obtained are summarized in the table below.

| Stirring mode (aging, crystallization) | Temperature and duration of the aging | Temperature and duration of the crystallization | Crystal-linity with respect to the reference |
|---|---|---|---|
| Static | 50° C./20 h | 95° C./4 h | 80% |
| Static | 50° C./48 h | 95° C./4 h | 95% |
| Static | 50° C./70 h | 95° C./4 h | 100% |
| Archimedean Screw | 50° C./20 h | 95° C./4 h | 97% |
| Propeller | 50° C./20 h | 95° C./4 h | 60% |
| Propeller | 50° C./48 h | 95° C./4 h | 63% |

It can be seen that:
the use of a classical stirrer (of the "plane propeller" type) does not allow the obtention of a product with good crystallinity;
the industrial operation in the static mode is much slower than on the laboratory scale; the gel undergoes considerable syneresis, which goes against a close contact between the reagents and can explain the increase in the duration of the aging;
the Archimedean screw allows the preservation of the durations of the synthesis obtained in the laboratory while producing LSX with very comparable quality (granulometry, chemical composition and crystallinity).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Method for the manufacture of low silica faujasites comprising aging and crystallizing a gel having a mole composition:

$Na_2O/(Na_2O+K_2O)$: 0.7–0.8

$H_2O/Al_2O_3$: 91–130

$SiO_2/Al_2O_3$: 1.8–2.2

$(Na_2O+K_2O)/Al_2O_3$: 5.5–8 wherein during said aging and said crystallization, the gel is stirred using an Archimedean screw stirrer.

2. Method according to claim 1, wherein the shearing generated in the gel by the Archimedean screw is less than 25 $sec^{-1}$.

3. Method according to claim 1, wherein the aging takes from 10–40 h at temperatures of 30–60° C. and the crystallization from 1–5 h at temperatures of 50–100° C.

* * * * *